Figure 1:
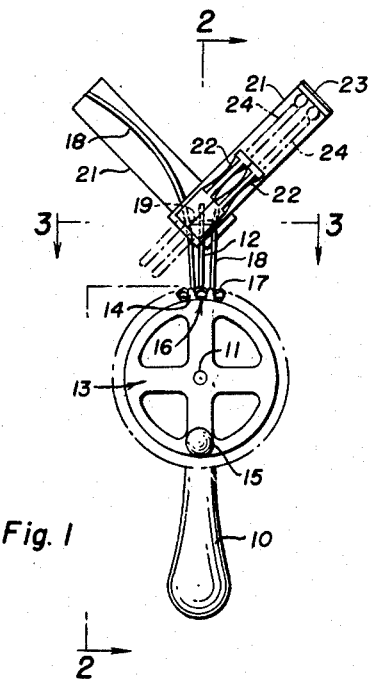

April 2, 1957     Z. HRYCAN     2,787,161
DEVICE FOR SHAKING DOWN THE MERCURY
IN A CLINICAL THERMOMETER
Filed Aug. 9, 1955

Zenon Hrycan
    *INVENTOR.*

BY *Hoag, Kilbury & Carlson*

*ATTORNEYS*

| United States Patent Office | 2,787,161
Patented Apr. 2, 1957 |

2,787,161

DEVICE FOR SHAKING DOWN THE MERCURY IN A CLINICAL THERMOMETER

Zenon Hrycan, New York, N. Y.

Application August 9, 1955, Serial No. 527,346

4 Claims. (Cl. 73—373)

The present invention relates to a device for shaking down the mercury in clinical thermometers.

It is an object of the present invention to provide a novel device for this purpose which will accomplish this in a speedy, positive and efficient manner without risk of injury to the thermometers and at the same time which provides means for easy loading and removal of the thermometers thereon and which can be manufactured at a relatively very low cost.

As is commonly known the column of mercury in a clinical thermometer remains stationary after use and must be returned to a position somewhere below the lowest body temperature that may be expected to be found in a human being before it can be used again. Otherwise there is the possibility that the initial reading of the thermometer might be above that of the body temperature of the next person whose body temperature is to be taken and a false indication of that person's body temperature would be observed. The most usual way to return the column of mercury to what may be termed and is hereinafter referred to as its "zero position" is for the attendant or patient, should he be taking his own body temperature, to grasp the thermometer at the end away from the one containing the reservoir of mercury and by a snap wrist action shake it several times until it has been observed that the mercury column has returned to a position that is sufficiently low. In a clinic, hospital ward or any other similar place where it is desired to take the temperature of a group of several people this manual way of returning the mercury column in a clinical thermometer takes a long time between each patient, thus is inefficient of time and requires the expenditure of physical energy by the attendant which, where the number of people whose temperature is to be taken is large, may be very tiring. Further should the person manipulating the thermometer give a too vigorous or too rapid wrist snap there is the possibility that the thermometer may be broken.

It thus may be seen that it is of great advantage in any place where it is contemplated taking the body temperatures of a group of people to have a device at hand by the use of which the mercury column of one or more clinical thermometers may be easily returned to a zero position. It is realized that the return of the column of mercury to a zero position is but one of the steps required to prepare a clinical thermometer for reuse. In addition it must be sterilized after each use. With the use of a device such as that which is the subject matter of the present invention it is very simple to set up one or more stations in a hospital ward or clinic at which thermometers may be processed for re-use. Preferably they are placed in a sterilization bath first and after being thoroughly sterilized are placed in the device of the present invention where the mercury column is reduced to a zero position as will be more fully described hereinafter and then left there for further use or placed in a suitable receptacle reserved for thermometers ready for use. Should it be so desired the thermometers can be first processed in the device covered in the present invention, be removed therefrom and placed in and allowed to remain in the sterilization bath until needed.

The present invention will best be understood from a consideration of the detailed description in the following specification taken in connection with the accompanying drawings forming a part of the present application, with the understanding, however, that the invention is not confined to any strict conformity with the showing of the drawings but may be changed or modified, so long as such changes or modifications mark no material departure from the salient features of the invention as expressed in the appended claims.

Figure 2:
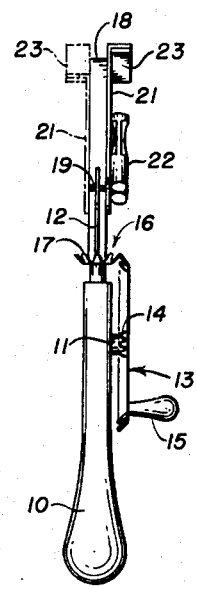
Figure 4:
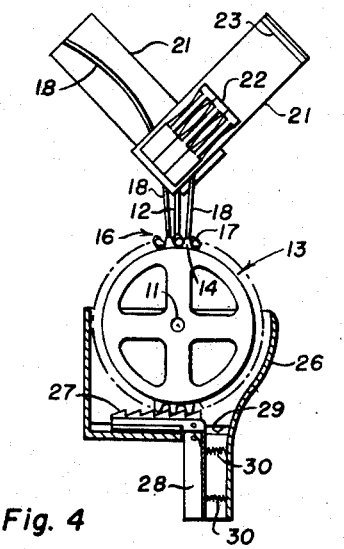
Figure 3:
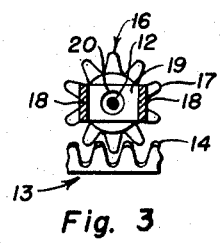

In the drawings:

Figure 1 is a side elevation partially cut away of a preferred embodiment of the present invention, Figure 2 is a view along the line 2—2 of Figure 1, Figure 3 is a cross section on the line 3—3 of Figure 1, and Figure 4 is a modification of the embodiment shown in Figures 1 to 3 wherein a different form of drive is shown.

Referring to Figures 1 and 2 the device is provided with a handle or body portion 10 of any suitable material and of a shape so that it can be easily grasped and held by a person using the device. Two shafts, 11 and 12, are fixedly mounted in handle or body portion 10. As shown in the drawings shaft 11 is in a horizontal position and shaft 12 in a vertical position. Gear wheel 13 has gear teeth 14, to be hereinafter described in further detail, on its periphery and is rotatably mounted on shaft 11 in any suitable manner. Gear wheel 13 is in the case of the embodiment shown in Figures 1 and 2 provided with a handle 15 fixedly attached thereto in any suitable manner.

A small gear wheel 16 is rotatably and loosely mounted around vertical shaft 12 and the gear teeth 17 thereon are adapted to mesh with gear teeth 14 in a manner to be hereinafter described in full. Fixedly attached to small gear wheel 16 are arms 18, 18 which obviously rotate with small gear wheel 16. Vertical shaft 12 extends beyond handle or body portion 10 for some distance and has again loosely fitted around it collar or plate 19 which is fixedly attached to arms 18, 18 which has a centrally located aperture 20 of sufficiently larger diameter than that of vertical shaft 12 to permit appreciable lateral movement therebetween.

Arms 18, 18 as they extend upward are curved away from the axis of the device as defined by vertical shaft 12. Fixedly mounted on each arm 18 at a portion thereof which is spaced from vertical shaft 12 in any suitable manner is a thermometer carrier generally designated as 21. Each thermometer carrier 21 may be provided to receive any number of thermometers but the most thermometers that may be inserted in each carrier 21 which is consonant with economical and convenient design is six. The manner in which the thermometers are secured in the thermometer carrier 21 forms no part of the present invention except that the thermometers are so placed that the reservoirs which hold the mercury are at the outer ends of thermometer carriers 21. In the drawing there is shown clips 22 and end sockets 23 for retaining the thermometer 24, shown in broken lines, in place during operation. Clips 22 and end sockets 23 are designated in any suitable manner to prevent the thermometers 24 from damage. However, the detailed design of the thermometer carriers 21 may be altered in any number of ways and their details of design can readily be chosen by anyone skilled in the art to meet the particular requirements of any particular adaptation of the device. For example, they may all be designed to accommodate thermometers of one size, they may be designed to accommodate thermometers of different sizes or each may be adjustable so that within limits it may accommodate a thermometer of any size.

As is most clearly shown in Figures 2 and 3 the gear teeth 14 and gear teeth 17 are bent at an angle approximately 45° to their respective gear wheels 13 and 16 thus are at an angle of approximately 90° to each other. Further as is clearly shown in these two figures the two sets of gear teeth 13 and 17 fit together relatively loosely. This together with the loose fit of arms 18, 18 and collar or plate 19 around vertical shaft 12 is an important feature of my invention as will be further shown hereinafter where the operation of the device is described.

It is to be noted by reference to both Figures 1 and 4 that thermometer carriers 21, 21 are so arranged that the longitudinal axes of thermometers 24 carried thereon are at an angle of approximately 45° to the axis of the device as defined by vertical shaft 12. In practice I have found that most desirable results are obtained if this angle is maintained at 45° or near thereto, but successful operation has been experienced when this angle is altered anywhere within the range of 30° to 60° to vertical shaft 12 and it is to be understood that, although I recommend that the device be designed so that this angle is approximately 45°, I do not desire to be limited thereto and desire to include within the scope of my invention any angle within the range of 30° to 60° which combines the application to the thermometers of centrifugal motion and simultaneously the proper eccentric vibration.

The method of driving gear wheel 13 forms no part of the present invention and it may be done in any conventional method known to the art. As an alternative drive I have shown in Figure 4 a modification of my device. In this figure body portion or handle 25 is provided with an upper caselike portion 26 to which are mounted horizontal shaft 11 and vertical shaft 12 and which extends around a portion of gear wheel 13. Rack gear 27 is pivotally joined to trigger member 28 slideably mounted in handle portion 25 and is adapted to engage gear teeth 14 on gear wheel 13. Rack gear 27 is slideably mounted in tracks 29 in case portion 26 and is spring biased to engage with gear teeth 14 when trigger member 28 is squeezed into handle portion 25 but does not engage gear teeth 14 when trigger member 28 is released. Springs 30 cause trigger member 28 to retract as soon as it is manually released. Thus squeezing trigger member 28 into handle portion 25 and its release impart rotation to gear wheel 13 through rack gear 27 and gear teeth 14.

Other arrangements of driving gear wheel 13 will be obvious to those skilled in the art.

The operation of the device may be described as follows: When handle 15 is rotated, arms 18, 18, thermometer carriers 21, 21 and thermometers 24 are rotating by reason of the intermeshing of gear teeth 14 and gear teeth 17 and the mounting of arms 18, 18 on vertical shaft 12. Thus centrifugal force is applied to the thermometers in a direction which tends to cause any mercury remaining in the columns of the thermometers to travel toward the reservoir in the thermometers which are turning in a circle or larger diameter than that in which any other part of the thermometers are travelling. This however is not sufficient and it is an important part of my invention to apply to the thermometers at the same time that the centrifugal force is applied to them another force. This may be described as a shaking force applied while the thermometers are rotating and combined with the centrifugal force may be termed an eccentric centrifugal force. It is produced by the looseness between gear teeth 14 and gear teeth 17 and by the looseness of the mounting of arms 18, 18 on vertical shaft 12. In other words during the operation of my device while the thermometers are being whirled and thus subjected to a centrifugal force they are also being subjected to a shaking force. A few turns of handle 15 will spin gear wheel 13 and will be sufficient to return the mercury in the thermometers to their "zero positions." Or referring to Figure 4 one or two squeezings of trigger member 28 will accomplish the same result.

The materials of which the various parts of my device may be made forms no part of the present invention and they may be chosen from any of the materials known to be suitable for the respective functions these parts perform. For example, handles 10 and 15 may be of wood and the rest of the parts metal such as stainless steel.

What I claim is:

1. A device for retracting the mercury in the columns in clinical thermometers comprising a rotatable gear wheel having gear teeth thereon, a second gear wheel having gear teeth thereon and carrying a thermometer holding structure, an elongated support for said gear wheels on which said second gear wheel and said thermometer holding structure is loosely mounted by means to permit motion between said structure and said support in a direction parallel to the long dimension of said support and in directions at right angles to said first direction, the gear teeth on said first gear wheel and the gear teeth on said second gear wheel disposed to mesh loosely and means for rotating said first gear wheel whereby there is imparted to said thermometers in a direction to cause the mercury therein to return to the reservoir in said thermometers a combined rotational and shaking motion in both lateral and longitudinal directions.

2. A device for retracting the mercury in the columns of clinical thermometers comprising a body portion, a first gear wheel mounted thereon having gear teeth on its periphery, a fixed shaft mounted on said body portion, a second gear wheel loosely mounted on said shaft by a collar permitting said gear wheel to move along said shaft and at the same time to move in directions radial to said shaft, said second gear wheel having gear teeth on its periphery and disposed to have its gear teeth loosely intermesh with the gear teeth of said first gear wheel, a framework fixedly attached to said second gear wheel and moving therewith comprising arms to which are connected carriers for said thermometers each disposed at an angle from 30° to 60° to said shaft and means for driving said first gear wheel whereby there is imparted to said carriers and said thermometers a combined rotational and shaking motion.

3. A device for retracting the mercury in the columns of clinical thermometers comprising a body portion, a first gear wheel mounted thereon having gear teeth on its periphery, a fixed shaft mounted on said body portion, a second gear wheel loosely mounted on said shaft by a collar permitting said gear wheel to move along said shaft and at the same time to move in directions radial to said shaft, said second gear wheel having gear teeth on its periphery disposed at an angle of substantially 90° to the gear teeth mounted on said gear wheel and disposed to have its gear teeth loosely intermesh with the gear teeth of said first gear wheel, a framework fixedly attached to said second gear wheel and moving therewith comprising arms to which are connected carriers for said thermometers each disposed at an angle from 30° to 60° to said shaft and means for driving said first gear wheel whereby there is imparted to said carriers and said thermometers a combined rotational and shaking motion.

4. A device for retracting the mercury in the columns in clinical thermometers comprising an elongated body portion, a gear mounted on said body portion, a second rotating gear loosely meshed with said first gear and driven thereby, a structure rigidly connected to said second gear but loosely supported on said body portion by a collar permitting limited relative motion between said structure and said body portion in a plurality of directions, means fixedly mounted on said structure for holding said thermometers in a position forming an angle between 30° to 60° with the longitudinal axis of said body portion, and means for driving said first gear whereby said thermometers are rotated in a substantially conical path and simultaneously are given motion both relatively longitudinal to and lateral to said longitudinal axis of said body portion.

References Cited in the file of this patent

UNITED STATES PATENTS

| | | |
|---|---|---|
| 365,120 | Laval | June 21, 1887 |
| 411,570 | Beimling | Sept. 24, 1889 |
| 2,685,799 | Sullivan | Aug. 10, 1954 |
| 2,718,787 | Shen | Sept. 27, 1955 |